INVENTORS.
W. G. BRAUN
W. E. K. KERRIS

United States Patent Office 2,975,368
Patented Mar. 14, 1961

2,975,368

HOLDING CIRCUIT FOR DIRECT READING FREQUENCY METERS

Wolfgang G. Braun, Kettering, Ohio (3917 Villanova Road, Dayton 9, Ohio), and Wolfram E. K. Kerris, North Hollywood, Calif.; said Kerris assignor to the United States of America as represented by the Secretary of the Air Force Filed Nov. 25, 1958, Ser. No. 776,390

11 Claims. (Cl. 328—140)

(Granted under Title 35, U.S. Code (1952), sec. 266)

The invention described herein may be manufactured and used by or for the United States Government for governmental purposes without payment to us of any royalty thereon.

This invention relates to circuits for producing a voltage that is directly proportional to the frequency of an alternating electric signal. A commonly used circuit for this purpose first converts the alternating signal into a series of identical current pulses having a frequency that is the same as, or proportional to, the frequency of the alternating signal. A voltage is then derived that is proportional to the average value of this pulse current, the average value of the current being a linear function of frequency. This voltage is derived by passing the pulse current through a resistor-capacitor network, the current magnitude being made independent of network potential by means of a high gain inverting direct current amplifier. The voltage across the network is proportional to the average value of the pulse current and therefore to the frequency of the original signal.

A circuit of the above type operates satisfactorily for a continuous input signal. However, if the input signal fades below the threshold of recognition, as may occur when the input signal is a received radio signal as in certain guidance systems for aircraft or missiles, the current pulses are missing and the output voltage decays exponentially due to discharge of the capacitor in the averaging network. The result is an indication, erroneously, of a gradual reduction in frequency. If the fading occurs in repeated intervals comparable in duration to the time constant of the averaging circuit, the output voltage will be lower than the voltage the system would yield if fed with a continuous signal of the same frequency.

The purpose of the invention is to provide a frequency indicating circuit of the above type which minimizes the error due to an intermittent input signal. This is accomplished by means of a holding circuit which senses the disappearance of the input signal and operates to hold the output voltage at the value it had when the input signal ceased. Upon return of the input signal the holding circuit again becomes inoperative and the system functions normally.

A more detailed description of the invention will be given with reference to the specific embodiment thereof shown in the accompanying drawings in which—

Figure 1:
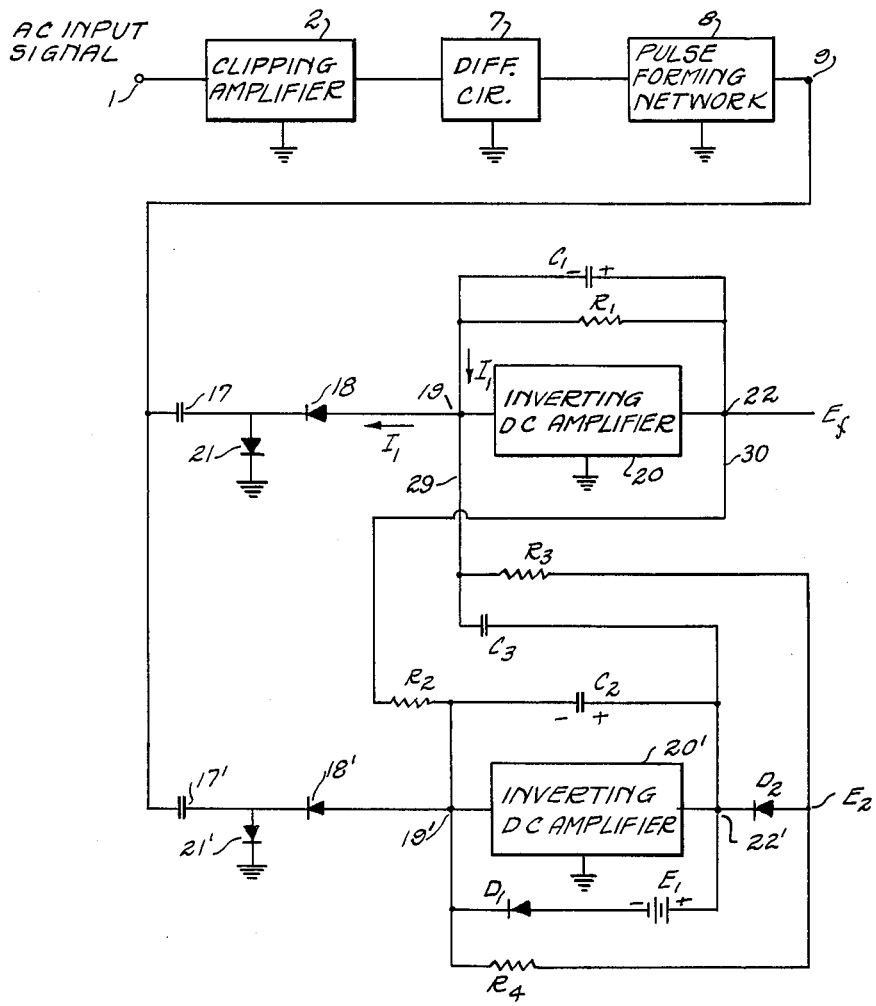
Figure 2:
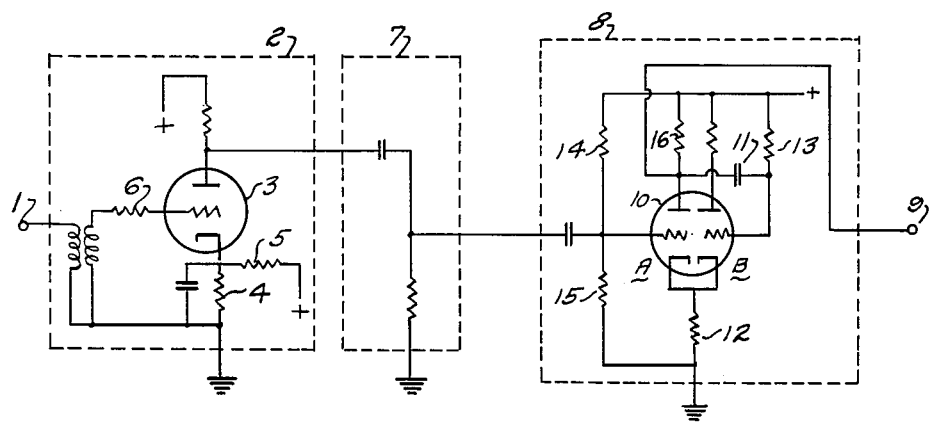
Figure 3:
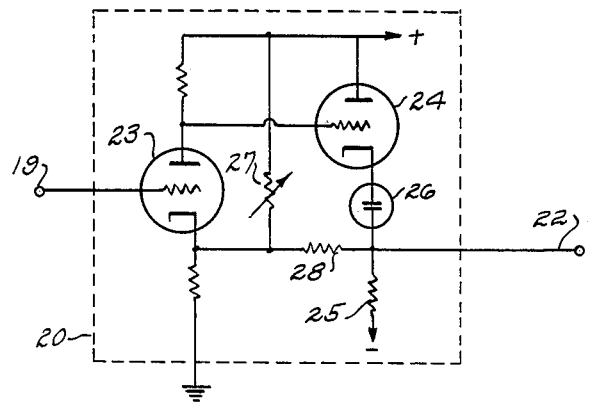
Figure 4:
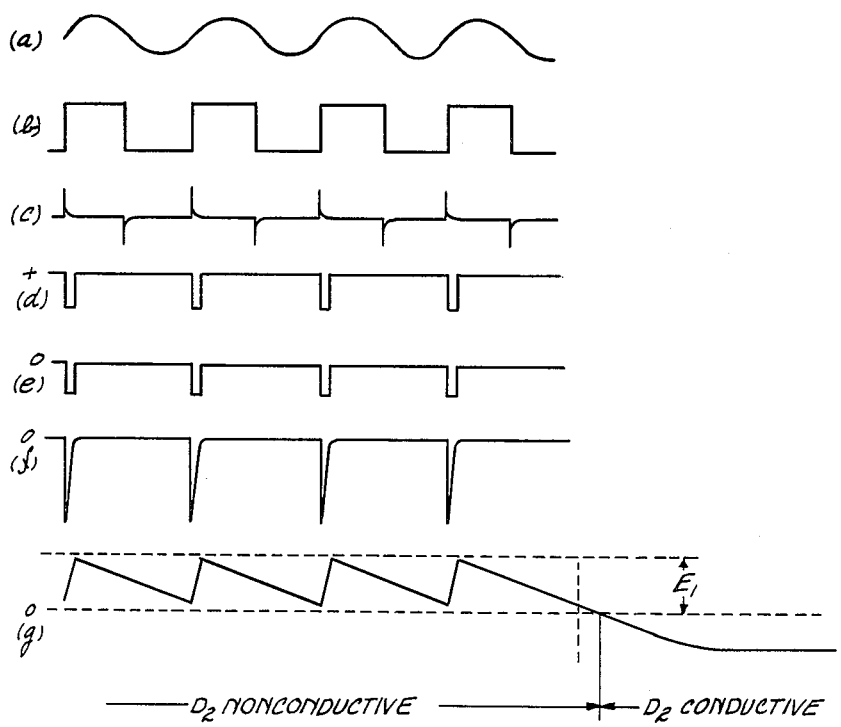
Figure 5:
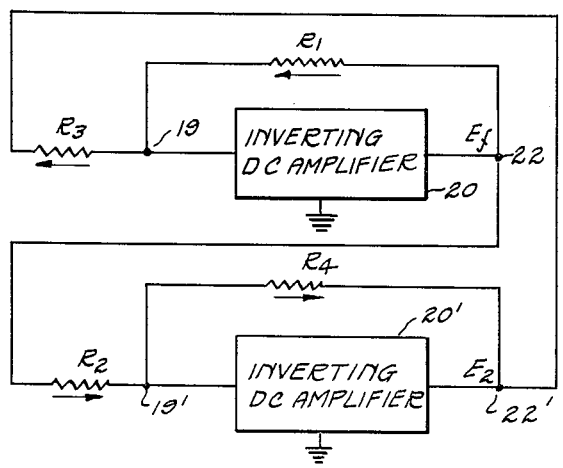

Fig. 1 is a diagram of a frequency meter circuit including a holding circuit in accordance with the invention, Fig. 2 is a schematic diagram of certain elements shown in block form in Fig. 1, Fig. 3 is a schematic diagram of a suitable direct current inverting amplifier for use in Fig. 1, Fig. 4 gives various waveforms occurring in the circuit of Fig. 1, and Fig. 5 is an equivalent circuit illustrating the operation of the holding circuit.

Referring to Fig. 1, the conventional part of the frequency indicating circuit will be described first. The input signal whose frequency is to be determined is applied between input terminal 1 and ground. This signal may be a sine wave as shown at (a) in Fig. 4. The sine wave is applied to clipping amplifier 2 which converts it into a substantially rectangular wave as shown at (b) in Fig. 4. The clipping amplifier may take the form shown in Fig. 2. Referring to this figure, tube 3 has its control grid biased midway between cathode potential and anode current cut-off potential by potential divider 4—5. Since the grid of tube 3 can not go positive relative to the cathode because of resistor 6, the positive half-cycles of the incoming wave limit when the grid reaches cathode potential. The negative half-cycles of the incoming wave limit when the grid reaches anode cut-off potential. As a result, the waveform at the anode of tube 3 is substantially as shown at (b) in Fig. 4. This wave is applied to a differentiating circuit which removes its direct current component and produces sharp alternately positive and negative pulses in its output as shown at (c) in Fig. 4. The differentiating circuit may be simply a series capacitor and shunt resistor as shown in Fig. 2.

The positive pulses in the differentiator output are used to trigger the pulse forming network 8, this circuit being insensitive to the negative pulses. The pulse forming network 8 operates to produce at output terminal 9 a series of identical negative rectangular pulses, as seen at (d) in Fig. 4, which correspond to and are synchronized with the positive pulses in the output of differentiator 7. There is therefore one pulse produced by network 8 for each cycle of the incoming wave at terminal 1.

The pulse forming network 8 may be a cathode coupled monostable multivibrator as shown in Fig. 2. The operation of circuits of this type is well understood in the art. Section A of tube 10 has its anode coupled to the grid of section B through condenser 11. Section B in turn is regeneratively coupled back to the input of section A by common cathode resistor 12. Since the grid of section B is connected to positive potential through a resistor 13 the circuit has a stable state in which section B is fully conductive and section A is nonconductive. The potential between the grid and cathode of section A is determined by potential divider 14—15 and the drop across resistor 12. The resistors 14—15 are so selected that the potential of the grid of section A is somewhat below the anode cut-off value when the circuit is in its stable state (section B conductive). With section A nonconductive, output terminal 9, which is connected to the anode of this section, has its maximum potential. If now a positive pulse is applied to the grid of section A of sufficient magnitude to initiate conduction in this section, the regenerative feedback in the system causes an immediate transition to the unstable state of the circuit in which state section A is fully conductive and section B is cut off. This transition is accompanied by a rapid fall in the anode voltage of section A and a corresponding rapid fall in the voltage at output terminal 9 which is connected to this anode. Also the full drop in section A anode voltage is initially transmitted to the grid of section B, since the potential across condenser 11 can not change instantaneously, and this fall in grid potential is responsible for the anode current cut-off that occurs in section B.

Following the transition to the unstable state condenser 11 discharges through resistors 16 and 13 with the discharge current flowing in the direction indicated in Fig. 2. As the condenser discharges and the discharge current decays, the potential of the grid of section B rises toward the cut-off point. When the cut-off point is reached, conduction is initiated in section B, and, due to the regenerative nature of the circuit, a rapid transition back to the initial stable state occurs. In this transition the potential of the section A anode and terminal 9 rises rapidly to its initial value. The circuit remains in this state until the next positive pulse is applied to the grid of section A. Therefore, in each cycle of operation, the pulse forming circuit 8 generates a negative-going rectangular pulse at terminal 9 the duration of which is determined by the time constant of the R–C circuit consisting of condenser 11 and resistors 16 and 13. The pulses at terminal 9 are illustrated at (d) in Fig. 4.

The negative pulses at terminal 9 are applied through relatively large blocking condenser 17 and diode 18 to the input terminal 19 of inverting D.C. amplifier 20. Condenser 17 removes the direct current component from the pulse train at terminal 9 and shunt diode 21 clamps the resulting pulse train to zero or ground potential. The voltage wave on the cathode or left hand terminal of diode 18 therefore appears as at (e) in Fig. 4.

The direct current amplifier 20 should have the following properties: (1) signal inversion, i.e., a change in potential of input terminal 19 should be accompanied by an amplified change in potential of output terminal 22 in the opposite direction; (2) high gain; (3) very high input impedance so that no significant input current can flow; (4) a low output impedance; and (5) preferably provision for adjusting the no-signal potential of output terminal 22 to zero relative to ground. A suitable form which this amplifier may take is shown in Fig. 3. The anode of tube 23 is directly coupled to the grid of cathode follower tube 24 for which 25 is the output load resistor. The gaseous discharge device 26 is employed to introduce a constant voltage drop between the cathode of tube 24 and the upper end of local resistor 25. This permits proper biasing of tube 24 without loss of output signal. As may be seen in Fig. 1, input terminal 19 has a direct current connection through $R_1$ to output terminal 22. The potential of the cathode of tube 23, and therefore the bias of this tube, may be adjusted at resistor 27 to such value that, with no input signal, terminal 22 is at ground or zero potential. The lower end of resistor 25 is returned to a point of negative potential of such value that tube 23 has a correct operating bias when the foregoing condition is attained. Since input terminal 19 is connected to terminal 22, it also will be at zero potential relative to ground in the absence of an input signal. If desired, the gain of the amplifier may be increased by the addition of resistor 28 for the introduction of regenerative feedback. Instability will not result from this feedback because of the stabilizing effect of the negative feedback produced by network $R_1$—$C_1$ (Fig. 1). As required, the amplifier of Fig. 3 inverts the input signal, has high gain, has a very high input impedance since the grid of tube 23 is negative relative to the cathode, has a low output impedance due to cathode follower output stage 24, and has provision for adjusting the no-signal potential of output terminal 22 to zero.

Referring again to Fig. 1, and considering the connections 29 and 30 to be nonexistent for the present, the network $R_1$—$C_1$ connected between output terminal 22 and input terminal 19 causes a signal to be fed back to terminal 19 that opposes any change in the potential of this terminal. For example, if the potential of terminal 19 tends to change in the negative direction the potential of terminal 22 changes in a positive direction, due to the amplifier inversion, and this change is fed back through the $R_1$—$C_1$ network to terminal 19 and opposes its initial change. The circuit therefore tends to hold the potential of point 19 constant. While infinite gain in amplifier 20 would be required to hold the potential of point 19 exactly constant, practical high gain amplifiers are capable of holding the potential variation of this point within an insignificantly small range. Accordingly, in the subsequent discussion of the system, terminal 19 will be considered to be always at zero or ground potential.

With terminal 19 at ground potential, each negative voltage pulse produced by pulse forming network 8 causes a pulse of current to flow from point 19 through diode 18 and blocking condenser 17 to the pulse forming network 8. The current pulses, like the voltage pulses, are all identical. This pulse current is designated $I_1$ and is represented by waveform (f) in Fig. 4. Further, since current can flow to point 19 only through the network $R_1$—$C_1$, the amplifier input being substantially an open circuit, the same current $I_1$ must also flow through the network in order to satisfy Kirchoff's law that the sum of the currents entering and leaving point 19 be zero. Therefore, a current of the waveform shown at (f) in Fig. 4 flows through the network $R_1$—$C_1$ and it is apparent that the average value of this current is proportional to the frequency of the signal at input terminal 1. The $R_1$—$C_1$ network produces a smoothed voltage from this current that is proportional to its average value and therefore to the frequency of the original signal. This voltage, designated $E_f$, appears across the terminals of the $R_1$—$C_1$ network, $C_1$ acquiring a charge of the polarity shown, and also between output terminal 25 and ground since point 19 is at ground potential. The time constant of the $R_1$—$C_1$ network is determined by the lowest frequency to be measured and the rate of change of the frequency to be measured. It should be considerably larger than the period of the lowest frequency but short enough that the changes in frequency can be closely followed.

In the circuit so far described, $E_f$ accurately represents the frequency of the original signal provided there is no break in the continuity of the original wave. However, should the incoming signal stop for any reason, $E_f$ would decay exponentially due to the discharge of $C_1$ and indicate, erroneously, a decrease in frequency. With intermittent interruptions in the incoming signal the voltage $E_f$ represents the average value of the current including the interruptions and thus indicates a frequency below the correct value.

In order to remedy this situation in accordance with the invention a holding circuit is provided that operates upon cessation of the signal to produce a current flow through the $R_1$—$C_1$ network that is equal to the average value of the pulse current $I_1$ that was flowing when the signal stopped. This current flow continues until the signal returns, at which time the holding circuit is automatically rendered ineffective. By duplicating the $I_1$ current in this manner the magnitude of $E_f$ is preserved during the signal break.

Referring again to Fig. 1, the holding circuit comprises an inverting D.C. amplifier 20', which may be identical to amplifier 20, having input and output terminals 19' and 22' corresponding to input and output terminals 19 and 22 of amplifier 20. Terminal 9 of pulse forming network 8 is coupled to input terminal 19' in the same manner that it is coupled to input terminal 19, i.e., over blocking condenser 17' and diodes 18' and 21' which correspond to elements 17, 18 and 21, respectively. Therefore, the same voltage pulse signal appears at the cathode or left hand terminal of diode 18' that appears at the cathode of diode 18. A condenser $C_2$ is connected between output terminal 22' and input terminal 19'. This condenser is shunted by a voltage limiting circuit consisting of diode $D_1$ and voltage source $E_1$ which prevents the voltage across the condenser from exceeding the value $E_1$ for reasons which will be apparent later. Input terminal 19' of amplifier 20' is connected through $R_2$ to output terminal 22 of amplifier 20. Also, when switching diode $D_2$ is conductive as will be explained later, output terminal 22' is connected to input terminal 19 through $R_3$ and to input terminal 19' through $R_4$. Because of the negative feedback through $C_2$ and the high gain of amplifier 20', input terminal 19', like input terminal 19, is prevented from departing appreciably from ground or zero potential.

The operation of the circuit under the normal condition of a continuous input signal will be considered first. With a continuous input signal, point 22 has a positive potential proportional to the frequency of the signal. Therefore, since point 19' is always at ground potential, a continuous current flows from point 22 through $R_2$ to point 19'. Because of the low output impedance of amplifier 20 and the relatively large value of $R_2$ this current has no effect on the output potential $E_f$. The effect of this current is to tend to raise the potential of point 19'. However, the magnitude of the pulse output of network 8 is made sufficient to override this effect. Therefore, during the presence of a negative voltage pulse on the cathode of diode 18', the net effect is in the direction to lower the potential of point 19' which raises the potential of point 22' due to the amplifier inversion. As a result, condenser $C_2$ charges with the polarity shown, the charging current flowing from point 22' through $C_2$ to point 19' where it joins the current through $R_2$. The combined currents then flow through diode 18' into condenser 17', the diode being conductive due to the negative voltage pulse on its cathode. Diode 21' can not conduct at this time because of the negative pulse on its anode. The charge that flows into condenser 17' during a negative voltage pulse instantly flows out again through diode 21' to ground at the end of the pulse.

During the intervals between negative voltage pulses the only potential acting on point 19' is that due to $E_f$ applied through $R_2$. The resulting upward pressure on the potential of point 19' causes a reduction in the space current of tube 24 which flows through resistor 25 (Fig. 3). This reduces the amplifier output voltage and permits $C_2$ to discharge toward point 22', an equal current flowing into the condenser from point 22 through $R_2$. Current can not flow from point 19' to ground through diodes 18' and 21' at this time since the negative feedback through $C_2$ will not permit point 19' to rise sufficiently above ground potential to initiate conduction in these diodes. Therefore, the entire current through $R_2$ flows into $C_2$ during the intervals between pulses. Since the output potential of amplifier 20' is proportional to $E_f$ during the intervals between pulses, the discharging rate of $C_2$ is proportional to $E_f$ and therefore to the frequency of the input signal. Consequently, the charges lost by $C_2$ during the between pulse intervals, like the charges gained by $C_2$ during the negative pulses, are equal and independent of frequency. As a result, during normal operation, a sawtooth of voltage of constant peak-to-peak amplitude is generated at point 22', the parameters of the circuit being so selected that the lowest potential of this point approaches but does not reach ground or zero potential. The voltage at point 22' during normal operation is represented by the first three cycles of the waveform (g) in Fig. 4. Preferably, the sawtooth waveform is stabilized by making the charge lost by $C_2$ during the intervals between pulses slightly less than the charge gained during the negative voltage pulses and opposing the resulting tendency for the average potential at point 22' to rise by means of the limiting circuit $E_1$—$D_1$ which limits the potential across $C_2$ to $E_1$.

During normal operation, the presence of the holding circuit does not affect the magnitude of $E_f$. As already stated, the current flow from point 22 to point 19' through $R_2$ does not affect $E_f$ because of the low output impedance of amplifier 20. Also, since point 22' is always positive during normal operation, switching diode $D_2$, which in effect has its anode biased to ground potential by being connected through $R_3$ and $R_4$ to points 19 and 19' which are at ground potential, is nonconductive and no current flow occurs in $R_3$ and $R_4$ since these resistors under this condition are merely connected in series between the equipotential points 19 and 19'. Therefore, the only effect produced by the holding circuit during normal operation is the application of the voltage sawtooth at point 22' to point 19 through $C_3$. Since $C_3$ can not pass direct current, this coupling produces no net current flow at point 19 and therefore does not influence the average value of $E_f$. However, the voltage sawtooth is opposite in phase to the negative pulse wave at the cathode of diode 18 and serves to materially smooth the voltage $E_f$ at point 22 without changing its average value.

When a break occurs in the input signal the holding circuit operates, within one pulse interval, to hold $E_f$ at its last value. If a negative pulse is missing at the cathodes of diodes 18 and 18', as illustrated for the fifth pulse in Fig. 4, condenser $C_2$ continues to discharge beyond the end of the normal interval between pulses as shown by waveform (g). When the potential of point 22' has fallen to slightly below ground or zero potential conduction is initiated in switching diode $D_2$ which effectively forms a direct current connection between the ends of $R_3$ and $R_4$ and point 22'. A direct current immediately begins to flow from point 19 through $R_3$ and $D_2$ to point 22'. This current increases as the potential of point 22' decreases, reaching a maximum value when point 22' has fallen to its minimum potential. The minimum value of this potential is determined by $E_f$ which is applied to point 19' through $R_2$. During the time that the potential of point 22' is falling a transient current also flows from point 19 through $C_3$ to point 22'. Therefore the current flowing from point 19 to point 22' during the transition period is greater than it would be without $C_3$ so that this condenser aids in maintaining the average value of the current through network $R_1$—$C_1$ and the magnitude of $E_f$ at their last values during this period.

At the end of the transition period, when point 22' has reached its lowest potential, the current flowing from point 19 to point 22' becomes constant and passes entirely through $R_3$. Therefore the presence of $C_3$ in the circuit may be ignored. Likewise, the constant current flow into point 19 passes entirely through $R_1$ so that the presence of $C_1$ may be ignored. Also, since point 22' has a constant negative potential the current flow from higher constant potential point 19' to this point is constant and therefore passes entirely through $R_4$ and $D_2$ so that the presence of $C_2$ may be ignored. Therefore, at the end of the transition period, the effective circuit is as shown in Fig. 5.

Referring to Fig. 5, because of the high gain of amplifiers 20 and 20' and the negative feedback through $R_1$ and $R_4$, points 19 and 19' are always substantially at ground potential, as explained before. Also, since no current can flow into the amplifiers from terminals 19 and 19' due to their high input impedances, the current in $R_1$ must equal the current in $R_3$ and the current in $R_4$ must equal the current in $R_2$. Therefore, since the current in $R_3$ is $E_2/R_3$ and the current in $R_1$ is $E_f/R_1$.

(1) $$\frac{E_f}{R_1} = \frac{E_2}{R_3}$$

and, since the current in $R_2 = E_f/R_2$ and the current in $R_4 = E_2/R_4$, (2) $$\frac{E_f}{R_2} = \frac{E_2}{R_4}$$

Eliminating $E_f$ and $E_2$ from (1) and (2) gives (3) $$\frac{R_3}{R_1} = \frac{R_4}{R_2}$$

If this relationship between the four resistors is established, the value of the constant current flowing through $R_1$ will equal the average value of the pulse current $I_1$ that was flowing in $R_1$ when the input signal ceased and this current will maintain the corresponding value of $E_f$. If the resistor ratio is established exactly, if the direct current amplifiers used are completely free from drift and other instability, and if the amplifier gains are high enough that no change in the potentials of points 19 and 19' can occur, the period for which $E_f$ could be maintained at its last magnitude would be, theoretically, unlimited. However, since these ideals can not be attained practically, the current in $R_1$ will decay slowly in an actual circuit. Nevertheless, it is possible with the holding circuit described to increase the effective time constant of the $R_1$—$C_1$ averaging network by a factor of from 100 to 1000. For example, assuming 10 c./s. as the lowest frequency to be measured and a time constant for the $R_1$—$C_1$ network of 100 times the period of this frequency or 10 seconds, the effective time constant can be increased to as much as 10,000 seconds or 167 minutes.

When the input signal is restored the potential of point 22′ rises and remains above ground potential as previously explained and as illustrated at (g) in Fig. 4. This prevents conduction in switching diode $D_2$ and disconnects $R_3$ and $R_4$ from point 22′. The holding circuit therefore becomes inoperative and the remainder of the circuit operates normally to maintain $E_f$ at a value proportional to the frequency of the input signal. If this frequency has changed during the signal break, the output of amplifier 20 will be correspondingly higher or lower and $C_1$ will charge further or discharge through $R_1$ as required to bring $E_f$ to a value proportional to the frequency of the restored signal.

We claim:

1. A circuit for producing a direct output voltage proportional to the frequency of an alternating input signal and for maintaining said output voltage during breaks in said input signal at the value it had when the break occurred, said circuit comprising: means for converting said input signal into a series of uniform voltage pulses having a repetition frequency proportional to said input signal; a two terminal averaging network; means coupling said series of voltage pulses to said averaging network for producing a corresponding series of uniform current pulses through said averaging network having an average value proportional to the average value of said voltage pulse series, the voltage across said averaging network constituting said output voltage; and a holding circuit coupled to said averaging network and receiving as inputs said voltage pulse series and said output voltage, said holding circuit operating during a break in said voltage pulse series to produce a constant direct current through said averaging network equal to the average value of said pulse current at the start of said break.

2. A circuit for producing a direct output voltage proportional to the frequency of an alternating input signal and for maintaining said output voltage during breaks in said input signal at the value it had when the break occurred, said circuit comprising: means for converting said input signal into a series of uniform voltage pulses having a repetition frequency proportional to said input signal; a first direct current inverting amplifier having an input terminal, an output terminal and a common terminal connected to a point of reference potential, said output terminal constituting also the output terminal for said circuit; an averaging network connected between the output and input terminals of said first amplifier; a second direct current inverting amplifier having an input terminal, an output terminal and a common terminal connected to said point of reference potential; means for applying said series of voltage pulses between said point of reference potential and the input terminal of said first amplifier whereby in the presence of said voltage pulse series a corresponding series of uniform current pulses having an average value proportional to the average value of said voltage pulse series is caused to flow through said averaging network; a resistive connection between the output terminal of said first amplifier and the input terminal of said second amplifier; means for applying said series of voltage pulses between said point of reference potential and the input terminal of said second amplifier; and means operative in the absence of said voltage pulses to establish resistive connections between the input terminal of said first amplifier and the output terminal of said second amplifier and between the output and input terminals of said second amplifier for producing a constant flow of direct current through said averaging network.

3. A circuit for producing a direct output voltage proportional to the frequency of an alternating input signal and for maintaining said output voltage during breaks in said input signal at the value it had when the break occurred, said circuit comprising: means for converting said input signal into a series of uniform voltage pulses having a repetition frequency proportional to said input signal; a first direct current inverting amplifier having an input terminal, an output terminal and a common terminal connected to a point of reference potential, said output terminal constituting also the output terminal for said circuit; an averaging network connected between the output and input terminals of said first amplifier; a second direct current inverting amplifier having an input terminal, an output terminal and a common terminal connected to said point of reference potential; means for applying said series of voltage pulses between said point of reference potential and the input terminals of said first amplifier whereby in the presence of said voltage pulse series a corresponding series of uniform current pulses having an average value proportional to the average value of said voltage pulse series is caused to flow through said averaging network; a resistive connection between the output terminal of said first amplifier and the input terminal of said second amplifier; a capacitor connected between the output and input terminals of said second amplifier; means for applying said series of voltage pulses between said point of reference potential and the input terminal of said second amplifier; and a diode having one electrode connected to the output terminal of said second amplifier and the other electrode connected through resistive connections to the input terminals of said first and second amplifiers, said diode being poled and biased to be nonconductive when the potential of the output terminal of said second amplifier is that which exists during the presence of said series of voltage pulses and to be conductive when this potential is that which exists during the absence of said series of voltage pulses.

4. A circuit for producing a direct output voltage proportional to the frequency of an alternating input signal and for maintaining said output voltage during breaks in said input signal at the value it had when the break occurred, said circuit comprising: means for converting said input signal into a series of uniform voltage pulses having a repetition frequency proportional to the frequency of said input signal; first and second direct current inverting amplifiers each having an input terminal, an output terminal and a common terminal connected to a point of reference potential; means for applying said series of voltage pulses in parallel between the input terminals of said amplifiers and said point of reference potential; a two terminal averaging network connected between the output terminal and the input terminal of said first amplifier, the voltage developed across said averaging network constituting the output voltage of said circuit; means for applying said output voltage through a resistance to the input terminal of said second amplifier; a condenser connected between the output and input terminals of said second amplifier; a diode having one electrode connected to the output terminal of said second amplifier and the other electrode connected through resistive connections to the input terminals of said first and second amplifiers; said diode being poled and biased to be nonconductive when the potential of the output terminal of said second amplifier is that which exists during the presence of said series of voltage pulses and to be conductive when this potential is that which exists during the absence of said series of voltage pulses; and means for limiting the maximum voltage that can occur across said condenser.

5. Apparatus as claimed in claim 4 in which there is a capacitive coupling between the output terminal of said second amplifier and the input terminal of said first amplifier.

6. A circuit for producing a direct output voltage proportional to the frequency of an alternating input signal and for maintaining said output voltage during breaks in said input signal at the value it had when the break occurred, said circuit comprising: means for converting said input signal into a series of uniform voltage pulses having a repetition frequency proportional to the frequency of said input signal; first and second direct current inverting amplifiers each having an input terminal, an output terminal and a common terminal connected to a point of reference potential; means for applying said series of voltage pulses in parallel between the input terminals of said amplifiers and said point of reference potential; a two terminal averaging network connected between the output terminal and the input terminal of said first amplifier, said network consisting of a capacitor shunted by a resistor $R_1$, the voltage developed across said averaging network constituting the output voltage of said circuit; a resistor $R_2$ connected between the output terminal of said first amplifier and the input terminal of said second amplifier; a capacitor connected between the output and input terminals of said second amplifier; a diode having one electrode connected to the output terminal of said second amplifier and the other electrode connected through a resistor $R_3$ to the input terminal of said first amplifier and through a resistor $R_4$ to the input terminal of said second amplifier, said diode being poled and biased to be nonconductive when the potential of the output terminal of said second amplifier is that which exists during the presence of said series of voltage pulses and to be conductive when this potential is that which exists during the absence of said series of voltage pulses; the relative values of said resistors being such that the ratio of $R_3$ to $R_1$ equals the ratio of $R_4$ to $R_2$.

7. Apparatus as claimed in claim 6 in which means are provided for limiting the voltage that can occur across the capacitor between the output and input terminals of said second amplifier to a predetermined maximum.

8. Apparatus as claimed in claim 7 in which a capacitive coupling is provided between the output terminal of said second amplifier and the input terminal of said first amplifier.

9. A circuit for producing a direct output voltage proportional to the frequency of an alternating input signal and for maintaining said output voltage during breaks in said input signal at the value it had when the break occurred, said circuit comprising: means including a pulse generator for converting said input signal into a series of uniform voltage pulses having a repetition frequency proportional to the frequency of said input signal; first and second direct current inverting amplifiers each having an input terminal, an output terminal and a common terminal connected to a point of reference potential, and in each of which the potential of said output terminal equals said reference potential when the input terminal is at said reference potential; couplings between said pulse generator and the input terminals of said amplifiers for applying said series of voltage pulses to said input terminals in parallel, said coupling containing unidirectional devices poled to prevent current flow between said input terminals and said pulse generator in a direction opposite to that of the current flow produced during and by said voltage pulses; means for clamping the input terminals of said amplifiers to said reference potential for voltages of polarity opposite that of said voltage pulses; a capacitor and a resistor $R_1$ connected in parallel between the output and input terminals of said first amplifier; a resistor $R_2$ connected between the output terminal of said first amplifier and the input terminal of said second amplifier; a diode having one electrode connected to the output terminal of said second amplifier and the other electrode connected through a resistor $R_3$ to the input terminal of said first amplifier and through a resistor $R_4$ to the input terminal of said second amplifier; the relative values of said resistors being such that the ratio of $R_3$ to $R_1$ equals the ratio of $R_4$ to $R_2$; and a capacitor connected between the output and input terminals of said second amplifier; the said direct output voltage of said circuit appearing between the output terminal of said first amplifier and said point of reference potential.

10. Apparatus as claimed in claim 9 in which means are provided to limit the voltage across the capacitor connected between the output and input terminals of said second amplifier to a predetermined maximum value.

11. Apparatus as claimed in claim 10 in which a capacitive coupling is provided between the output terminal of said second amplifier and the input terminal of said first amplifier.

References Cited in the file of this patent

UNITED STATES PATENTS

| | | |
|---|---|---|
| 2,307,316 | Wolff | Jan. 5, 1943 |
| 2,403,557 | Sanders | July 9, 1946 |
| 2,490,243 | Tellier | Dec. 6, 1949 |
| 2,572,788 | Weighton | Oct. 23, 1951 |
| 2,907,022 | Kendall | Sept. 29, 1959 |